United States Patent
Murata et al.

(10) Patent No.: US 10,974,668 B2
(45) Date of Patent: Apr. 13, 2021

(54) WIRE HARNESS INCLUDING BRANCHING CIRCUIT GROUPS

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP); TOYOTA JIDOSHA KABUSHIKI KAISHA, Aichi (JP)

(72) Inventors: Takahiro Murata, Mie (JP); Hirokazu Komori, Mie (JP); Taiko Sato, Aichi (JP); Hiroyuki Ishikawa, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/647,240

(22) PCT Filed: Jun. 26, 2018

(86) PCT No.: PCT/JP2018/024128
§ 371 (c)(1),
(2) Date: Mar. 13, 2020

(87) PCT Pub. No.: WO2019/058686
PCT Pub. Date: Mar. 28, 2019

(65) Prior Publication Data
US 2020/0282928 A1     Sep. 10, 2020

(30) Foreign Application Priority Data
Sep. 20, 2017   (JP) .............................. JP2017-180042

(51) Int. Cl.
*H01B 7/17* (2006.01)
*H01R 4/10* (2006.01)
(Continued)

(52) U.S. Cl.
CPC ....... *B60R 16/0215* (2013.01); *H01B 7/0045* (2013.01); *H01B 7/17* (2013.01);
(Continued)

(58) Field of Classification Search
CPC .... B60R 16/0215; H01B 7/0045; H01B 7/17; H02G 3/04; H01R 4/10; H01R 31/08
(Continued)

(56) References Cited

U.S. PATENT DOCUMENTS 5,184,960 A * 2/1993 Hopkins ................. B60D 1/62
280/422
5,600,232 A * 2/1997 Eavenson, Sr. ....... H02J 7/1423
322/10

(Continued)

FOREIGN PATENT DOCUMENTS

JP   H11-176242   7/1999
JP   2000-57853   2/2000
(Continued)

OTHER PUBLICATIONS

Japanese Office Action, Japanese Patent Office, Application No. 2017-180042, dated Jun. 9, 2020 (with English translation).
(Continued)

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

A wire harness includes a first circuit group and a second circuit group. The first circuit group has one end connected to a first connector and another end connected to a second
(Continued)

connector. The second circuit group has one end connected to the first connector and another end connected to a third connector. The second circuit group branches from the first circuit group at a position of the second connector or at a position of a connection target connected by the second connector.

9 Claims, 7 Drawing Sheets

(51) Int. Cl.
  *H01R 31/08* (2006.01)
  *H02G 3/04* (2006.01)
  *B60R 16/02* (2006.01)
  *H01B 7/00* (2006.01)
(52) U.S. Cl.
  CPC ............ *H01R 4/10* (2013.01); *H01R 31/08* (2013.01); *H02G 3/04* (2013.01)
(58) Field of Classification Search
  USPC ...................................................... 174/72 A
  See application file for complete search history.

(56) References Cited

U.S. PATENT DOCUMENTS

| | | | | |
|---|---|---|---|---|
| 5,936,407 | A * | 8/1999 | Borland | G01R 31/006 324/504 |
| 6,396,210 | B1 * | 5/2002 | Menze | B60Q 1/305 307/10.8 |
| 7,572,149 | B2 * | 8/2009 | Matsuura | H01R 12/616 439/620.21 |
| 8,249,759 | B2 * | 8/2012 | Lazzara | B60R 25/045 701/2 |
| 9,653,894 | B2 * | 5/2017 | Kitamura | H02G 3/0406 |
| 2002/0019165 | A1 * | 2/2002 | Aoki | B60R 16/0207 439/502 |
| 2008/0200048 | A1 * | 8/2008 | Matsuura | H01R 12/616 439/78 |
| 2010/0088004 | A1 * | 4/2010 | Maki | H02G 3/086 701/102 |
| 2011/0251736 | A1 * | 10/2011 | Lazzara | B60R 25/045 701/2 |
| 2016/0181775 | A1 * | 6/2016 | Kitamura | H01R 9/2416 174/72 A |
| 2018/0342334 | A1 * | 11/2018 | Sugimoto | B60R 16/023 |

FOREIGN PATENT DOCUMENTS

| | | |
|---|---|---|
| JP | 2001-14955 | 1/2001 |
| JP | 2004-14475 A | 1/2004 |
| JP | 2005-294132 | 10/2005 |
| JP | 2010-103044 | 5/2010 |
| JP | 2014-146506 | 8/2014 |

OTHER PUBLICATIONS

International Search Report issued in International Patent Application No. PCT/JP2018/024128, dated Sep. 18, 2018, English translation.

International Preliminary Report on Patentability issued in International Patent Application No. PCT/JP2018/024128, dated Sep. 10, 2019, English translation.

Chinese Office Action, Chinese Patent Office, Application No. 201880058608.6, dated Nov. 30, 2020, with Japanese translation and English translation.

* cited by examiner

WIRE HARNESS INCLUDING BRANCHING CIRCUIT GROUPS

TECHNICAL FIELD

The present invention relates to a wire harness including a branch.

BACKGROUND ART

In a wire harness including a branch part, the branch part is in some cases taped in a crossing manner, or subjected to waterproof treatment separately from a connector. In this case, man-hours may be increased for the above processes, and thus manufacturing of a wire harness may require more time and efforts.

Patent Document 1 relates to a wire harness including a branch part, and describes the following: in a plurality of wire groups whose ends are connected to one connector, a protective member is provided for each wire group whose other ends are connected to another connector. Patent Document 1 therefore discloses a technology of easily manufacturing of a wire harness including a branch part, without the necessity of the processes as described above.

PRIOR ART DOCUMENTS

Patent Documents

Patent Document 1: Japanese Patent Application Laid-Open No. 2000-57853

SUMMARY

Problem to be Solved by the Invention

However, according to the technology described in Patent Document 1, different protective members need to be provided in a part on the same route up to the branch part.

In view of this, the present invention has an object to provide a technology that enables easy manufacturing of a wire harness including a branch part, without the provision of different exterior materials in a part on the same route up to the branch part.

Means to Solve the Problem

To solve the problems described above, a wire harness according to a first aspect includes: a first circuit group having one end connected to a first connector and another end connected to a second connector; and a second circuit group having one end connected to the first connector and another end connected to a third connector, the second circuit group branching from the first circuit group at a position of the second connector or at a position of a connection target connected by the second connector.

A wire harness according to a second aspect is the wire harness according to the first aspect, further including: a first wire group constituting the first circuit group; a second wire group constituting the second circuit group; and a sheath surrounding the first wire group and the second wire group between the first connector and the second connector.

A wire harness according to a third aspect is the wire harness according to the second aspect, further including a shield member surrounding the first wire group and the second wire group between the first connector and the second connector.

A wire harness according to a fourth aspect is the wire harness according to any one of the first to third aspects, in which the second circuit group includes at least one wire extending from the first connector to the third connector, the wire harness further includes a mold part, the mold part being made of a resin material and formed to surround the at least one wire on a rear end side of the second connector, the mold part being configured to support the at least one wire at the position of the second connector, and the at least one wire and the mold part are formed by insert molding.

A wire harness according to a fifth aspect is the wire harness according to any one of the first to fourth aspects, in which the second circuit group includes a first-part wire extending from the first connector to the second connector, and a second-part wire being short-circuited with the first-part wire through a short circuit and extending from the second connector to the third connector.

A wire harness according to a sixth aspect is the wire harness according to the fifth aspect, in which the short circuit includes a second connector-side short circuit provided in the second connector.

A wire harness according to a seventh aspect is the wire harness according to the fifth or sixth aspect, in which the short circuit includes a connection target-side short circuit provided in the connection target of the second connector.

A wire harness according to an eighth aspect is the wire harness according to any one of the first to seventh aspects, in which the second circuit group is used solely as a signal circuit.

Effects of the Invention

According to the first to eighth aspects, the first circuit group and the second circuit group can share one exterior material, in a part between the first connector and the second connector. Further, the second circuit group branches from the first circuit group at the position of the second connector or at the position of the connection target connected by the second connector. Therefore, the branch part need not be taped in a crossing manner. Further, if the branch part requires waterproof treatment, the waterproof treatment can be performed in conjunction with waterproof treatment for the connector. Owing to such configurations, the wire harness including a branch part can be easily manufactured. As a result, the wire harness including a branch part can be easily manufactured, without the provision of different exterior materials in a part on the same route up to the branch part.

If the sheath surrounding the first wire group and the second wire group is provided as in the wire harness according to the second aspect, branching of the wire inside the sheath in an intermediate part of a cable is burdensome. Also in the wire harness including the sheath as described above, the branch part can be easily formed by causing a branch at the position of the second connector.

If the shield member surrounding the first wire group and the second wire group is provided as in the wire harness according to the third aspect, branching of the wire inside the shield member in an intermediate part of a cable is burdensome. Also in the wire harness including the shield member as described above, the branch part can be easily formed by causing a branch at the position of the second connector.

Particularly, according to the fourth aspect, the second connector can adopt a connector having a configuration similar to a configuration of a connector in the related art.

Further, a design change is not particularly required for a circuit of the connection target of the second connector.

Particularly, according to the fifth aspect, the first-part wire can adopt a wire having the same length as the wire group constituting a part of the first circuit group between the first connector and the second connector.

Particularly, according to the sixth aspect, the second connector-side short circuit can be omitted from the circuit of the connection target of the second connector.

Particularly, according to the seventh aspect, the configuration of supporting the connection target-side short circuit can be omitted from a connector housing of the second connector.

The wire harness adopts a configuration that the second circuit group branches from the first circuit group at the position of the second connector or at the position of the connection target connected by the second connector. Therefore, the second circuit group may be in some cases required to be further elongated, as compared to a case where the second circuit group branches from the first circuit group between the first connector and the second connector. Here, in general, the wire constituting a signal circuit can adopt a smaller diameter than the diameter of the wire constituting a power circuit. Therefore, since each circuit of the second circuit group is used solely as a signal circuit according to the eighth aspect, the weight increased for the elongation can be reduced less, for example, as compared to a case where each circuit of the second circuit group is used as a power circuit.

DESCRIPTION OF EMBODIMENTS

First Embodiment

Figure 1:
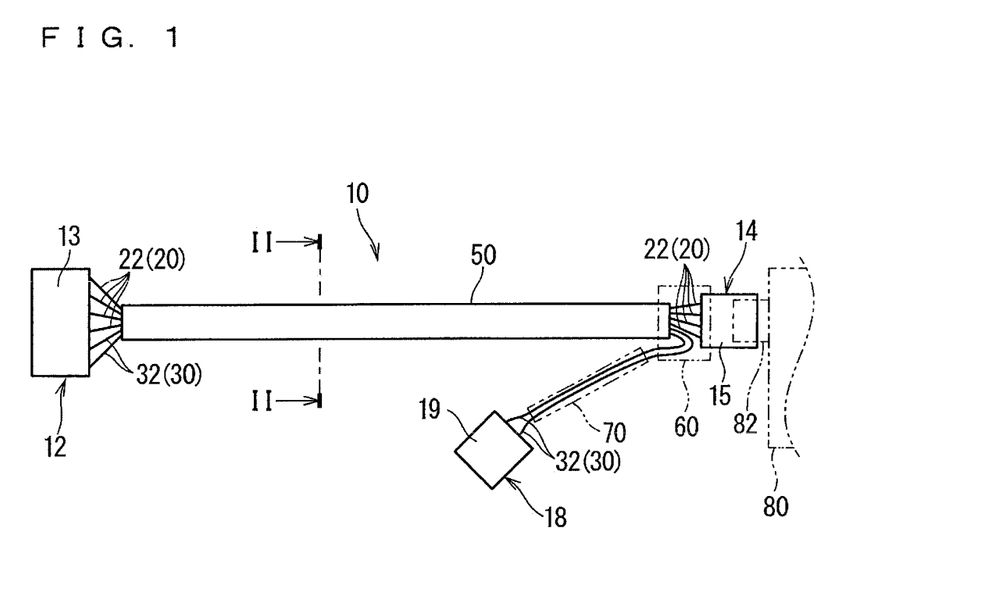
FIG. 1 is a schematic plan view illustrating a wire harness according to a first embodiment.
Figure 2:
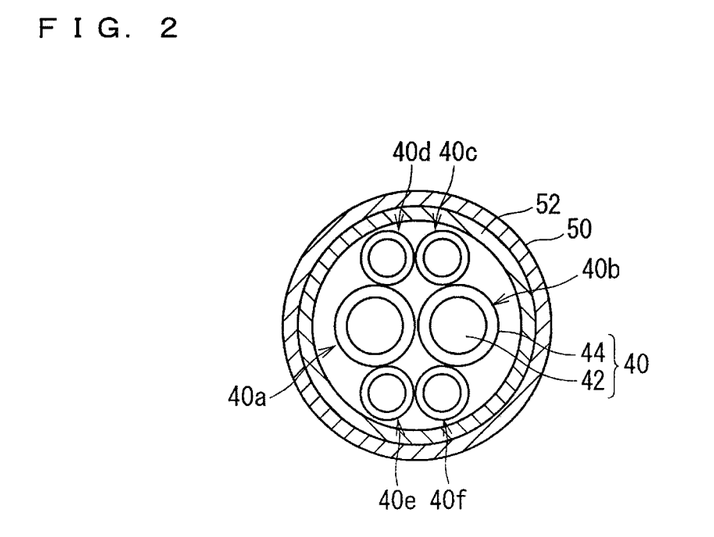
FIG. 2 is a cross-sectional view taken along the line II-II of FIG. 1.
Figure 3:
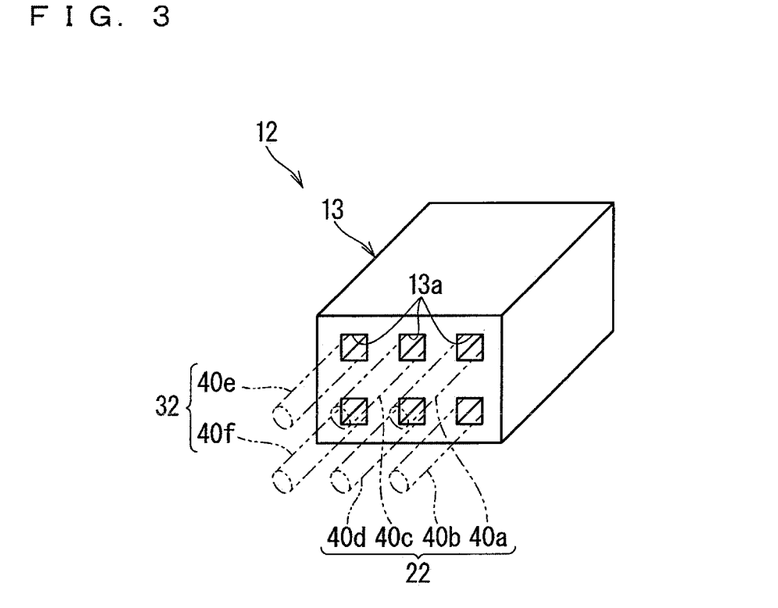
FIG. 3 is a schematic perspective view illustrating a first connector.
Figure 4:
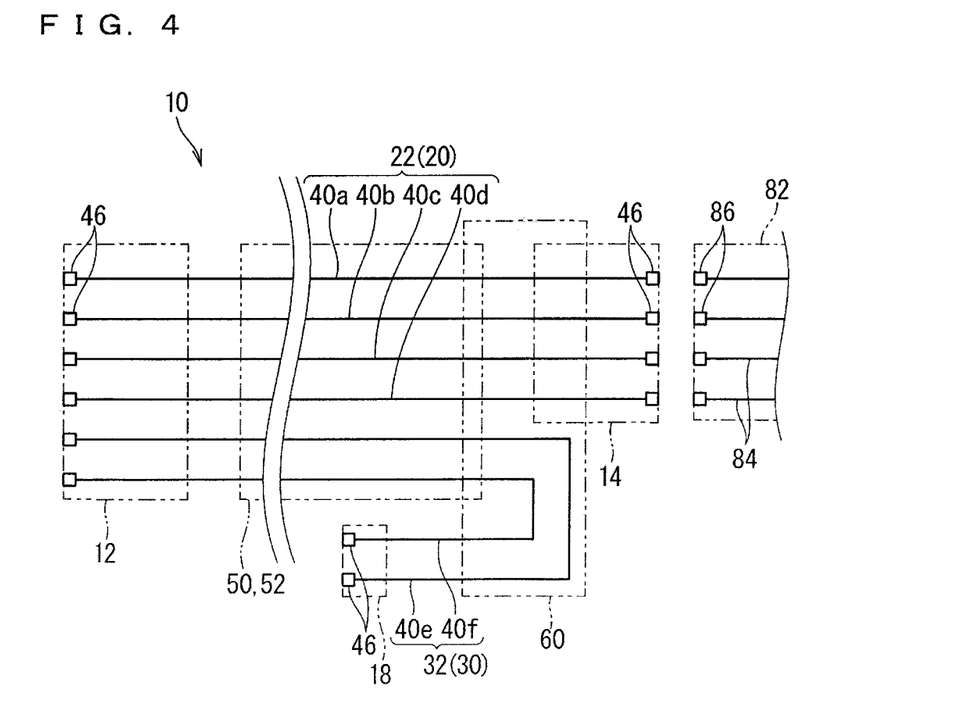
FIG. 4 is a schematic block diagram illustrating a circuit configuration of the wire harness according to the first embodiment.

A wire harness according to the first embodiment will be described below. FIG. 1 is a schematic plan view illustrating a wire harness 10 according to the first embodiment. FIG. 2 is a cross-sectional view taken along the line II-II of FIG. 1. FIG. 3 is a schematic perspective view illustrating a first connector 12. FIG. 4 is a schematic block diagram illustrating a circuit configuration of the wire harness 10 according to the first embodiment.

The wire harness 10 includes a first connector 12, a second connector 14, a third connector 18, a first circuit group 20, and a second circuit group 30. To the first connector 12, one end portion of the first circuit group 20 and one end portion of the second circuit group 30 are connected. To the second connector 14, another end portion of the first circuit group 20 is connected. To the third connector 18, another end portion of the second circuit group 30 is connected. This is also described as follows, from the perspective of each of the circuit groups 20 and 30. Regarding the first circuit group 20, one end portion thereof is connected to the first connector 12, and another end portion thereof is connected to the second connector 14. Regarding the second circuit group 30, one end portion thereof is connected to the first connector 12, and another end portion thereof is connected to the third connector 18. In this case, the second circuit group 30 branches from the first circuit group 20, at a position of the second connector 14 or at a position of a connection target connected by the second connector 14. The description herein takes an example in which the second circuit group 30 branches from the first circuit group 20 at a position of the second connector 14.

More specifically, the wire harness 10 includes a first wire group 22 that constitutes the first circuit group 20, and a second wire group 32 that constitutes the second circuit group 30. Here, the first wire group 22 includes four wires 40a to 40d. Further, the second wire group 32 includes two wires 40e and 40f. In the example according to this embodiment, the second circuit group 30 includes at least one wire 40 extending from the first connector 12 to the third connector 18. Here, the two wires 40e and 40f extend from the first connector 12 to the third connector 18.

Each wire 40 includes a core wire 42, and insulation covering 44 that surrounds the core wire 42. The core wire 42 is made of a conductive material, such as copper and aluminum. The core wire 42 may consist of a single element wire, or may consist of a plurality of element wires. If the core wire 42 consists of a plurality of element wires, the plurality of element wires may be twisted together, or need not be twisted together. The insulation covering 44 is made of an insulating material such as resin (e.g., polyethylene, polyvinyl chloride, etc.), which is extruded to surround the core wire 42, for example.

The description herein assumes a case where, among the four wires 40a to 40d in the first wire group 22, a pair of wires 40a and 40b are used as power wires, and another pair of wires 40c and 40d are used as signal wires. The description herein also assumes a case where the two wires 40e and 40f in the second wire group 32 form a pair, and are used as signal wires. Therefore, the second circuit group 30 is used solely as a signal circuit. Note that the signal wires may be used as control signal wires, or may be used as sensor signal wires. The description herein assumes a case where the pair of wires 40c and 40d in the first wire group 22 are used as control signal wires, and the pair of wires 40e and 40f in the second wire group 32 are used as sensor signal wires. Each pair of wires 40 used as power wires or signal wires may be twisted together to be in the form of a so-called twisted pair wire, or need not be twisted together. Here, the diameter of each of the wires 40a and 40b used as power wires is larger than the diameter of each of the wires 40c to 40f used as signal wires. Note that the number, usage, diameter, etc. of each wire 40 are not limited to those described above.

As described above, to the first connector 12, one end portion of the first circuit group 20 and one end portion of the second circuit group 30 are connected. Further, to the second connector 14, another end portion of the first circuit group 20 is connected. Further, to the third connector 18, another end portion of the second circuit group 30 is connected. Accordingly, to the first connector 12, one end portion of each of the six wires 40*a* to 40*f* is connected. To the second connector 14, another end portion of each of the four wires 40*a* to 40*d* is connected. To the third connector 18, another end portion of each of the two wires 40*e* and 40*f* is connected.

Possible examples of a connection target of each of the connectors 12, 14, and 18 include a connector provided in another wire harness, and a connector provided in a device or the like. The following description assumes a case where the first connector 12 is connected to a connector (not shown) provided in another wire harness, the second connector 14 is connected to a connector 82 provided in a device 80, and the third connector 18 is connected to a connector (not shown) provided in another device that is different from the device 80 to which the second connector 14 is connected. Possible examples of the device include a drive source such as a motor, a control unit such as an electronic control unit (ECU), and various types of sensors. The description herein particularly assumes a case where the device 80 to which the second connector 14 is connected is a device 80 including a drive source and an ECU, and the device to which the third connector 18 is connected is a sensor.

Here, the connectors 12, 14, and 18 include connector housings 13, 15, and 19, respectively. As illustrated in FIG. 3, a plurality of cavities 13*a* are formed in the first connector housing 13. In a similar manner, a plurality of cavities are also formed in the second connector housing 15 and the third connector housing 19. In the cavities 13*a*, end portions of respective wires 40 are accommodated. For example, a terminal 46 is connected to an end portion of each wire 40 by crimping, welding, or pressure contacting, for example, and the terminal 46 is accommodated in the cavity 13*a*. The terminal 46 is made of any metal material, such as copper and a copper alloy. The terminal 46 may be plated with any metal, such as tin and nickel. For example, the terminal 46 is formed by further bending a metal sheet that is pressed into a predetermined shape. When the connector is connected to a connection target, the terminal 46 is connected to a conductor of the connection target. In this manner, each wire 40 is connected to a circuit of the connection target. For example, when the second connector 14 is connected to the connector 82 provided in the device 80 being a connection target, the terminal 46 is connected to a conductor 86 of the connection target. In this manner, each wire 40 is connected to the circuit 84 of the connection target.

Here, a part of the second wire group 32 between the first connector 12 and the second connector 14 and the first wire group 22 share the same sheath 50. Therefore, between the first connector 12 and the second connector 14, the sheath 50 surrounds the first wire group 22 and the second wire group 32. For example, the sheath 50 is made of an insulating material such as resin (e.g., polyethylene, polyvinyl chloride, etc.), which is extruded to surround the wire 40.

Further, here, a part of the second wire group 32 between the first connector 12 and the second connector 14 and the first wire group 22 share the same shield member 52. Between the first connector 12 and the second connector 14, the shield member 52 surrounds the first wire group 22 and the second wire group 32. For example, the shield member 52 may be a braided wire in which a plurality of metal element wires are braided into a ring shape, or may be a metal foil formed thin to attain flexibility, or the like. Note that, in the example illustrated in FIG. 2, the shield member 52 is located inside the sheath 50, and surrounds the first wire group 22 and the second wire group 32. Note that the shield member 52 may be located outside the sheath 50, and surround the first wire group 22 and the second wire group 32 by the whole sheath 50. Note that the wire harness 10 may include other shield members that are provided separately from the shield member 52, and that individually surround respective pairs of wires 40*a* and 40*b* (40*c* and 40*d*, and 40*e* and 40*f*).

As described above, the sheath 50 surrounds the first wire group 22 and the second wire group 32. Therefore, here, the first wire group 22, the second wire group 32, and the sheath 50 constitute one cable. Further, the provision of the shield member 52 makes the cable a shield cable. As the shield cable, for example, a cable cut from a long shield cable into a necessary length can be used. In this case, a cable end portion is stripped, for example. Note that, in the example according to this embodiment, the sheath 50 and the shield member 52 are stripped at a position of an end portion of the first wire group 22. Therefore, the sheath 50 and the shield member 52 are not provided in a part of the second wire group 32 between the second connector 14 and the third connector 18. In a part of the second wire group 32 between the second connector 14 and the third connector 18, another exterior material 70 may be provided as illustrated in FIG. 1, or need not be provided. Possible examples of the exterior material 70 include a sheet material, a corrugated tube, and a helically wound adhesive tape.

The wires 40*e* and 40*f* in the second wire group 32 extending from the first connector 12 to the third connector 18 are supported by a mold part 60, at the position of the second connector 14. The mold part 60 is made of a resin material and formed to surround the wires 40*e* and 40*f* on a rear end side of the second connector 14. The mold part 60 supports the wires 40*e* and 40*f* at the position of the second connector 14. The wires 40*e* and 40*f* and the mold part 60 are formed by insert molding. A member integrated with the mold part 60 is hereinafter referred to as an insert component.

Here, the cable end portion, the wires 40*a* to 40*d*, and a rear end part of the second connector housing 15 are also the insert components. Therefore, here, the mold part 60 is provided in an area between the sheath 50 of the cable end portion and the second connector housing 15. According to this configuration, the mold part 60 can provide waterproof property to both the cable and the second connector 14.

Note that the area for providing the mold part 60 is not limited to that described above. The wire 40*a* can be supported at the position of the second connector 14 by the mold part 60, as long as any one part out of a part of the cable end portion provided with the sheath 50, a part of the wires 40*a* to 40*d* constituting the first circuit group 20 and being exposed from the sheath 50, and a rear end part of the second connector housing 15 is formed into an insert component together with the wires 40*e* and 40*f*. Whether more than one of the above parts is adopted as an insert component shall be determined in consideration of required waterproof property etc.

For example, if waterproof property provided by the mold part 60 is not required in the cable end portion, the position of an edge portion of the cable in the mold part 60 may be the position of the exposed wires 40*a* to 40*d* extending from the sheath 50, instead of the position of the sheath 50. In other words, the part of the cable end portion provided with the sheath 50 need not be an insert component. In a similar manner, if waterproof property on the second connector 14 side is not required, the position of an edge portion of the second connector housing 15 in the mold part 60 may be the position of the wires 40*a* to 40*d* extending from the second connector housing 15, instead of the position of the second connector housing 15. In other words, the second connector housing 15 need not be an insert component.

Figure 5:
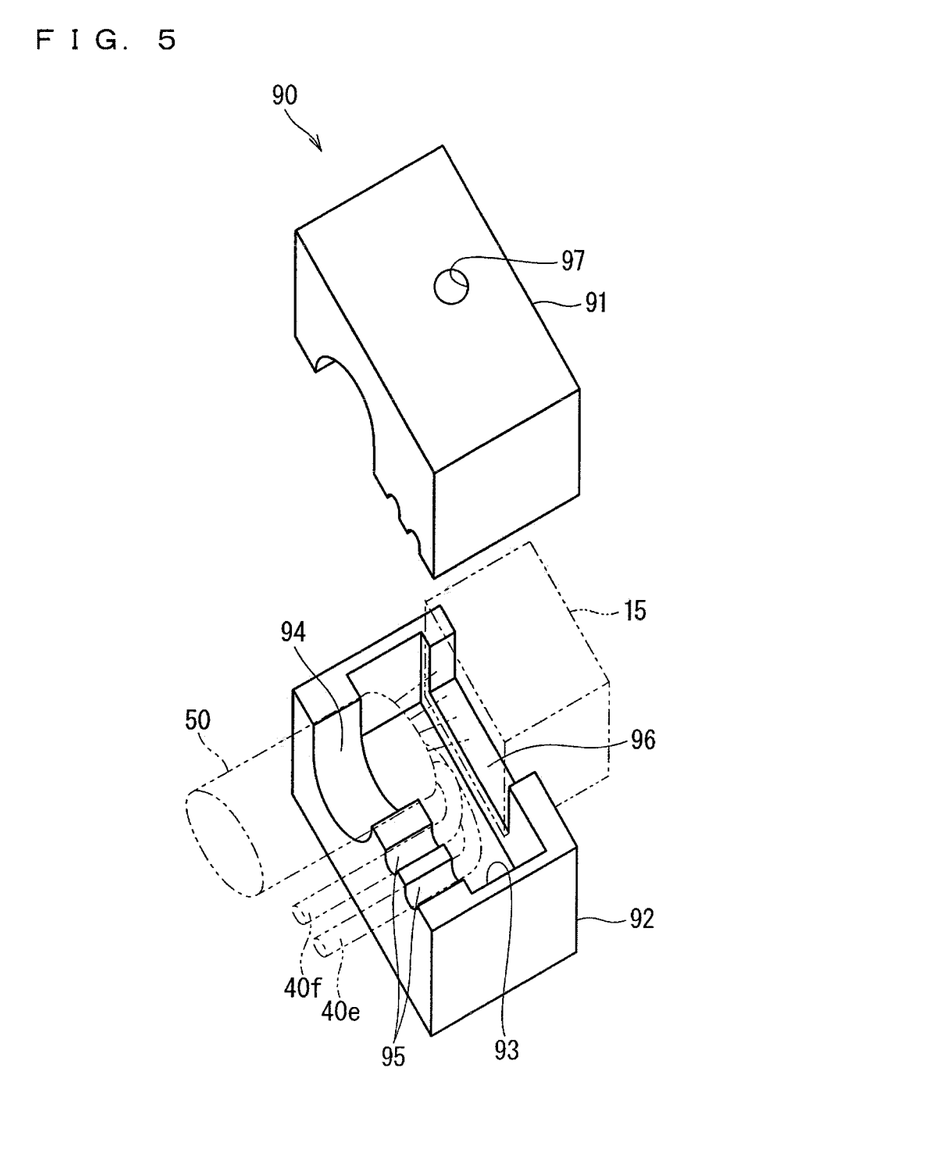
FIG. 5 is a schematic perspective view illustrating a mold for forming a mold part.

For example, the mold part 60 is formed by using a mold 90 as illustrated in FIG. 5. FIG. 5 is a schematic perspective view illustrating the mold 90 for forming the mold part 60.

The mold 90 consists of an upper mold 91 and a lower mold 92. Each of the upper mold 91 and the lower mold 92 includes a mold main body part 93, and a plurality of support parts 94 to 96. The mold main body part 93 is a part that forms a receiving space, in which molten resin injected into the mold 90 through an injection port 97 is received. The mold part 60 is formed through cooling and hardening of the molten resin received in the mold main body part 93. Each of the plurality of support parts 94 to 96 is formed into a groove-like shape connecting the mold main body part 93 and an outer surface of the mold 90. As the plurality of support parts 94 to 96, a cable support part 94 that supports the part of the cable end portion provided with the sheath 50, wire support parts 95 that support respective wires 40*e* and 40*f* extending from the cable end portion, and a housing support part 96 that supports the second connector housing 15 are herein provided. The inner surface shape of the support parts 94 to 96 may be formed into a shape in line with the outer surface shape of respective supported members.

Here, opening of each of the wire support parts 95 is provided on the same surface as the surface on which opening of the cable support part 94 is provided. Accordingly, with respect to the mold 90, the wires 40*e* and 40*f* extend from the cable end portion supported by the cable support part 94 and make a U-turn inside the mold main body part 93, and are supported by respective wire support parts 95. Therefore, in the wire harness 10, the wires 40*e* and 40*f* extend in the form of making a U-turn inside the mold part 60.

Note that the configuration that the wires 40*e* and 40*f* extend in the form of making a U-turn inside the mold part 60 is not a requirement. For example, in the mold 90, the opening of each of the wire support parts 95 may be provided on the same surface as the surface on which opening of the housing support part 96 is provided. In this case, in the wire harness 10, the wires 40*e* and 40*f* are pulled out of the surface from which the second connector housing 15 extends with respect to the mold part 60. Further, for example, in the mold 90, the opening of the wire support part 95 may be provided on a surface that is different from the surface on which the opening of the cable support part 94 is provided, or different from the surface on which the opening of the support part 96 is provided. In this case, in the wire harness 10, the wires 40*e* and 40*f* are pulled out of a surface that is different from the surface from which the cable extends or different from the surface from which the second connector housing 15 extends with respect to the mold part 60.

With the wire harness 10 according to the above embodiment, the first circuit group 20 and the second circuit group 30 can share the same exterior material (here, the shield member 52 and the sheath 50), in a part between the first connector 12 and the second connector 14. Further, the second circuit group 30 branches from the first circuit group 20 at the position of the second connector 14. Therefore, the branch part need not be taped in a crossing manner. Further, if the branch part requires waterproof treatment, the waterproof treatment can be performed in conjunction with waterproof treatment for the second connector 14. Owing to such configurations, the wire harness 10 including a branch part can be easily manufactured. As a result, the wire harness 10 including a branch part can be easily manufactured, without the provision of different exterior materials in a part on the same route up to the branch part.

Further, if the sheath 50 surrounding the first wire group 22 and the second wire group 32 is provided as in the wire harness 10, branching of the wires 40*a* to 40*f* inside the sheath 50 in an intermediate part of the cable is burdensome. Also in the wire harness 10 including the sheath 50 as described above, the branch part can be easily formed by causing a branch at the position of the second connector 14.

Further, if the shield member 52 surrounding the first wire group 22 and the second wire group 32 is provided as in the wire harness 10, branching of the wires 40*a* to 40*f* inside the shield member 52 in an intermediate part of the cable is burdensome. Also in the wire harness 10 including the shield member 52 as described above, the branch part can be easily formed by causing a branch at the position of the second connector 14.

Further, the second wire group 32 is not connected to the second connector 14. Therefore, the second connector 14 can adopt a connector having a configuration similar to a configuration of a second connector of a wire harness in the related art, which allows the second circuit group to branch from the first circuit group between the first connector and the second connector. Further, a design change is not particularly required for the circuit 84 of the device 80 being a connection target of the second connector 14.

Further, the wire harness 10 adopts a configuration that the second circuit group 30 branches from the first circuit group 20 at the position of the second connector 14. Therefore, the second circuit group 30 may be in some cases required to be further elongated, as compared to a case where the second circuit group 30 branches from the first circuit group 20 between the first connector 12 and the second connector 14. Here, in general, the wires 40*e* and 40*f* constituting signal circuits can adopt a smaller diameter than the diameter of the wires 40*a* and 40*b* constituting power circuits. Therefore, when each circuit of the second circuit group 30 is used solely as a signal circuit, the weight increased for the elongation can be reduced less, for example, as compared to a case where each circuit of the second circuit group 30 is used as a power circuit.

Second Embodiment

Figure 6:
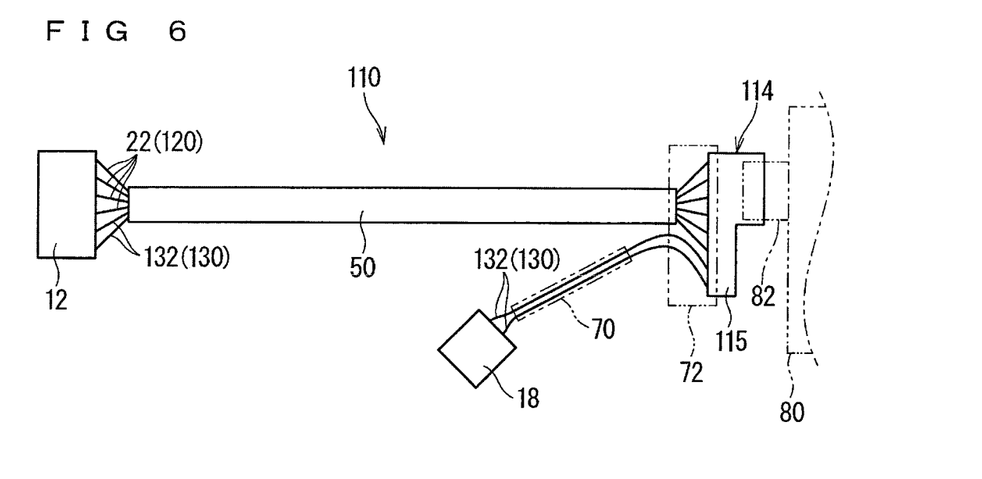
FIG. 6 is a schematic plan view illustrating a wire harness according to a second embodiment.
Figure 7:
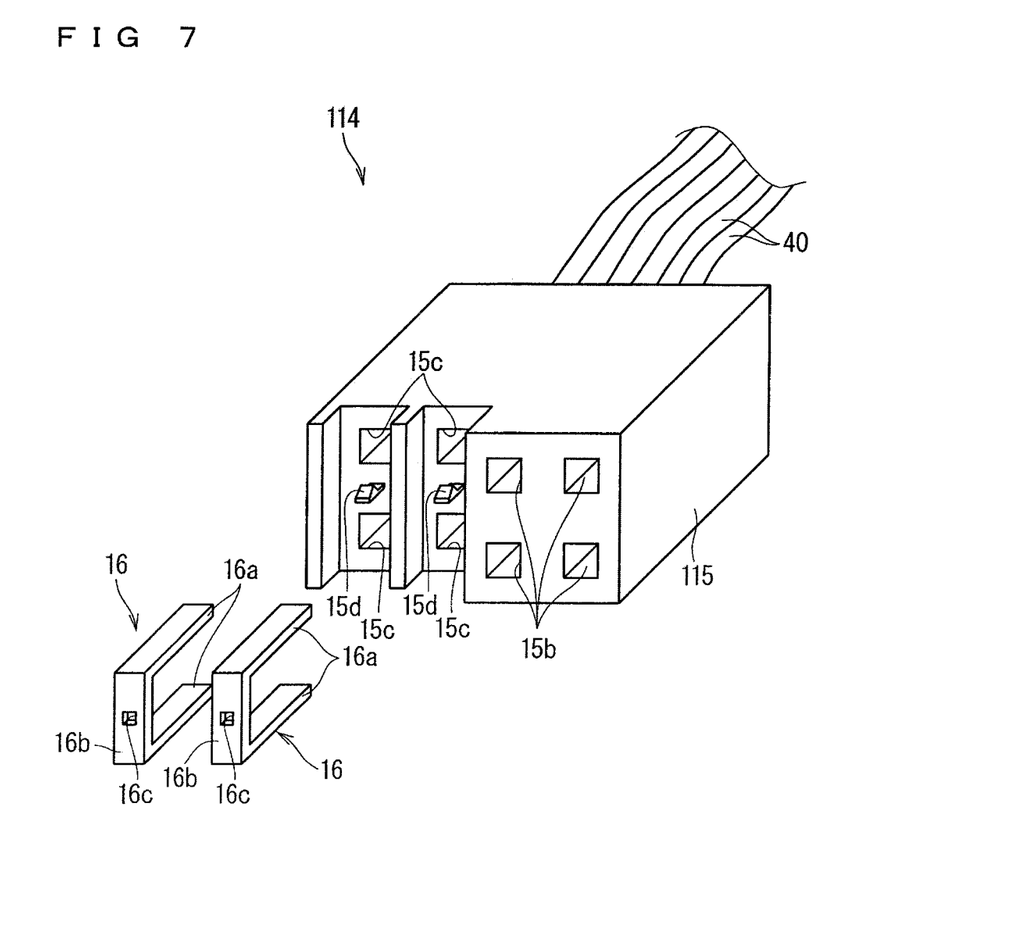
FIG. 7 is a schematic perspective view illustrating a second connector.
Figure 8:
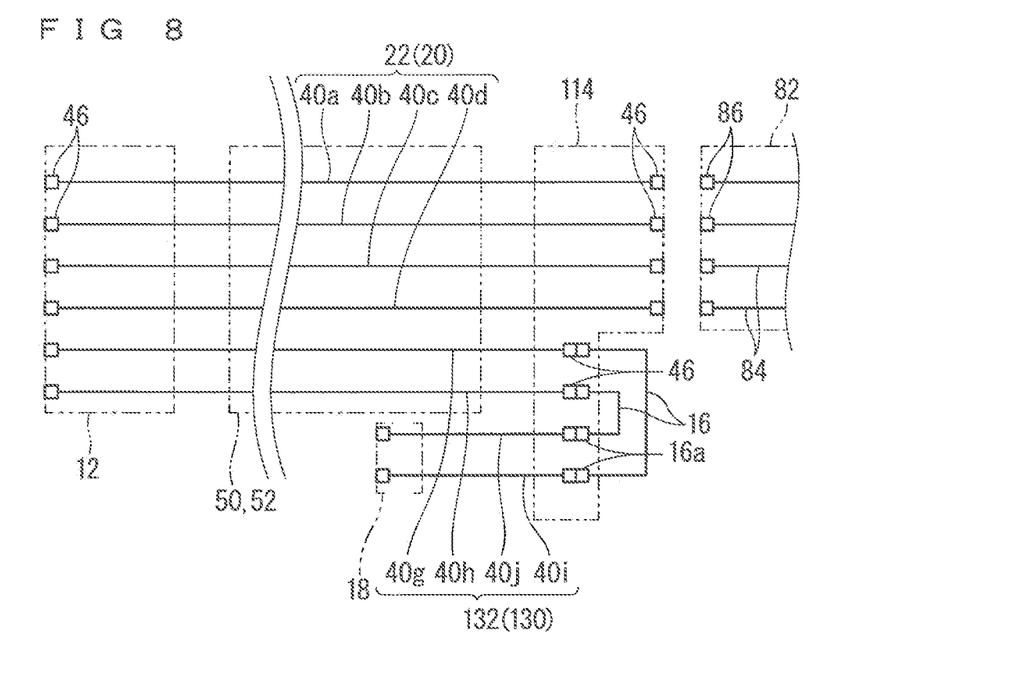
FIG. 8 is a schematic block diagram illustrating a circuit configuration of the wire harness according to the second embodiment.

Next, a wire harness according to the second embodiment will be described. FIG. 6 is a schematic plan view illustrating a wire harness 110 according to the second embodiment. FIG. 7 is a schematic perspective view illustrating a second connector 114. FIG. 8 is a schematic block diagram illustrating a circuit configuration of the wire harness 110 according to the second embodiment. Note that, in the description of this embodiment, components similar to those described above are denoted by the same reference signs to omit description thereof (the same applies to each of the embodiments described below).

The configuration of a second wire group 132 constituting a second circuit group 130 in the wire harness 110 according to this embodiment is different from the configuration of the second wire group 32 constituting the second circuit group 30 in the wire harness 10 according to the first embodiment. Accordingly, the shape of the second connector 114 is also changed from the shape of the second connector 14 in the wire harness 10 according to the first embodiment.

Specifically, the second wire group 132 consists of first-part wires 40g and 40h extending from the first connector 12 to the second connector 114, and second-part wires 40i and 40j respectively short-circuited with the first-part wires 40g and 40h through short circuits and extending from the second connector 14 to the third connector 18. In this case, the short circuits include second connector-side short circuits (here, bus bars 16) provided in the second connector 114. Therefore, to the second connector 114, end portions of the first-part wires 40g and 40h and end portions of the second-part wires 40i and 40j are connected. These are short-circuited by respective bus bars 16.

In the example illustrated in FIG. 7, as the second connector-side short circuits, two bus bars 16 are provided, each of which short-circuits one first-part wire 40g (40h) and one second-part wire 40i (40j). Each bus bar 16 includes two tab terminals 16a each formed into a male terminal shape, and a joining part 16b that joins the two tab terminals 16a. In the joining part 16b, a through hole 16c that allows an engagement protrusion 15d provided in the second connector housing 115 to be inserted and engaged is formed. For example, each bus bar 16 is made of any metal material, such as copper and a copper alloy. The bus bar 16 may be plated with any metal, such as tin and nickel. For example, the bus bar 16 is formed by further bending a metal sheet that is pressed into a predetermined shape.

Here, in a similar manner to the second connector 14 of the first embodiment, the second connector 114 also accommodates end portions of the wires 40a to 40d constituting the first circuit group 20. Therefore, in the second connector housing 115 of the second connector 114, cavities for accommodating respective end portions of the wires 40a to 40d and cavities for accommodating respective end portions of the first-part wires 40g and 40h and the second-part wires 40i and 40j are formed.

In a part of the second connector housing 115 corresponding to the cavities for accommodating the end portions of the wires 40a to 40d, a configuration for allowing the part to be connected to the connector 82 of the device 80 being a connection target is formed. In the example illustrated in FIG. 7, as such a configuration, insertion holes 15b that allow male terminals 86 of the device 80 to be inserted are formed. The part in which the insertion holes 15b are formed is fitted into the connector 82 of the device 80.

On the other hand, in a part of the second connector housing 115 corresponding to the cavities for accommodating the end portions of the first-part wires 40g and 40h and the second-part wires 40i and 40j, a configuration for allowing the part to be short-circuited with the bus bars 16 is formed. In the example illustrated in FIG. 7, as such a configuration, insertion holes 15c that allow the tab terminals 16a of the bus bars 16 to be inserted, and engagement protrusions 15d that can be inserted into and engaged with the through holes 16c formed in the bus bars 16 are formed. Four insertion holes 15c are formed, which communicate with their corresponding cavities. The engagement protrusions 15d are provided to protrude from a surface of the second connector housing 115 on which opening of each of the insertion holes 15c is formed. Here, two engagement protrusions 15d that support the two bus bars 16 are formed. Note that, in the example illustrated in FIG. 7, the surface on which the opening of each of the insertion holes 15c and the engagement protrusions 15d is formed in a recessed manner, but this configuration is not a requirement.

Note that the configuration of supporting the bus bars 16 is not limited to that described above. For example, the joining part 16b is herein formed into a shape being bent in a thickness direction with respect to the tab terminals 16a, so that the bus bars 16 short-circuit the first-part wires 40g and 40h and the second-part wires 40i and 40j separately disposed in the vertical direction. However, the joining part 16b may be formed into a shape being bent within a flat surface with respect to the tab terminals 16a, so that the bus bars 16 short-circuit the first-part wires 40g and 40h and the second-part wires 40i and 40j separately disposed in the horizontal direction. In this case, the second connector housing may be provided with press-fitting parts that allow the joining parts of the bus bars to be press-fitted, and the joining parts may be sandwiched in the thickness direction in the press-fitting parts.

In the wire harness 110 according to this embodiment, if an area between the second connector 114 and the cable end portion requires waterproof property, a protective cover 72 made of rubber may cover the area, for example. According to this configuration, waterproof treatment on the branch part can be performed in conjunction with the second connector 114.

With the wire harness 110 according to the this embodiment, the first-part wires 40g and 40h can adopt wires having the same length as the first wire group 22 constituting a part of the first circuit group 20 between the first connector 12 and the second connector 114. According to this configuration, for example, the first-part wires 40g and 40h can adopt wires constituting a cable together with the wires 40a to 40d, and the second-part wires 40i and 40j can adopt wires different from the wires constituting the cable. According to this configuration, the length of the cable of a predetermined length cut from a long cable can be reduced, as compared to the wire harness 10 according to the first embodiment. Further, the stripping amount of the sheath 50 and the shield member 52 in the second connector 114 can be reduced.

Further, owing to the provision of the bus bars 16 as the second connector-side short circuits, a short circuit can be omitted from the circuit 84 of the device 80 being a connection target of the second connector 114.

Third Embodiment

Figure 9:
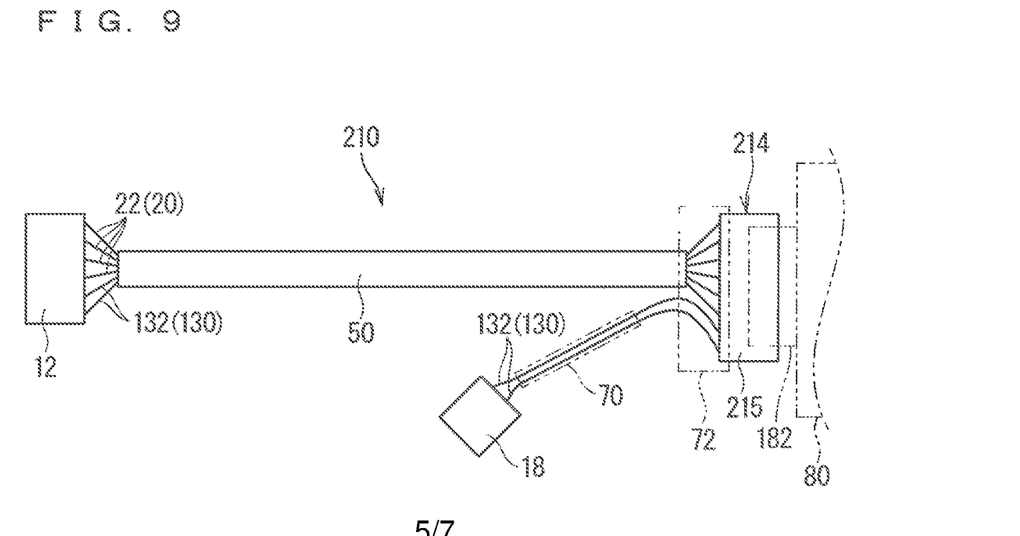
FIG. 9 is a schematic plan view illustrating a wire harness according to a third embodiment.
Figure 10:
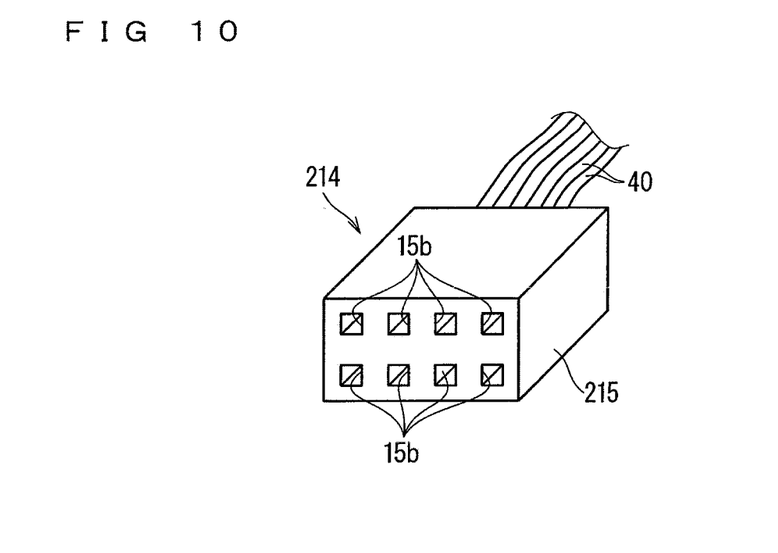
FIG. 10 is a schematic perspective view illustrating a second connector.
Figure 11:
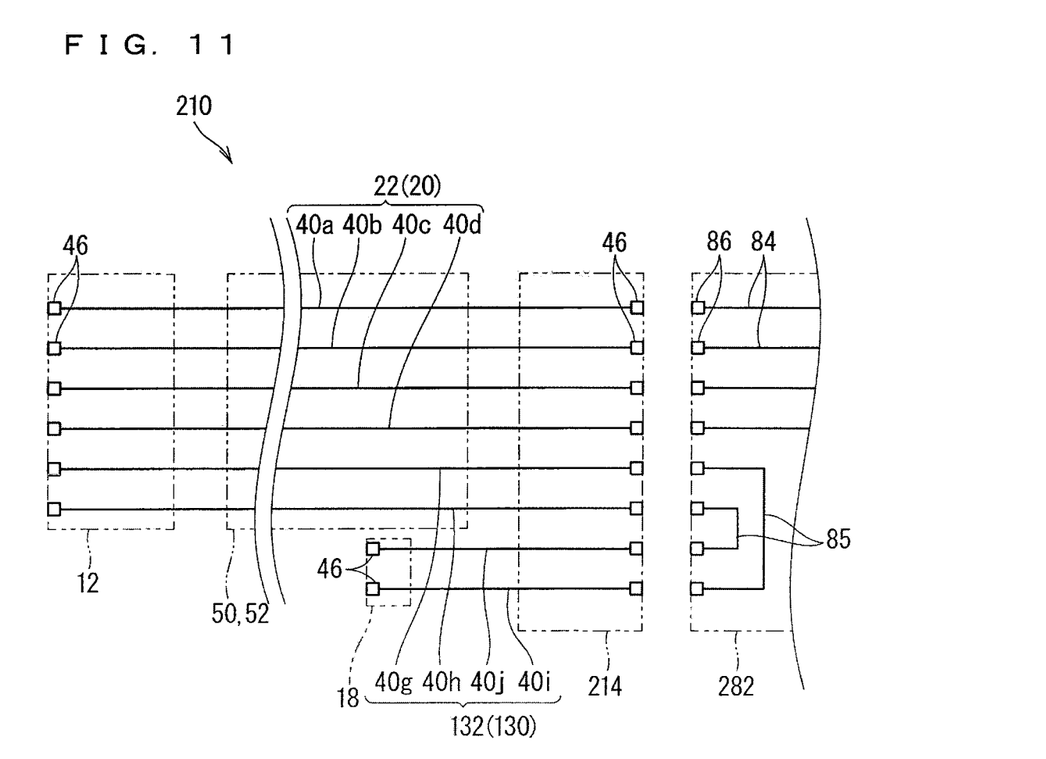
FIG. 11 is a schematic block diagram illustrating a circuit configuration of the wire harness according to the third embodiment.

Next, a wire harness according to the third embodiment will be described. FIG. 9 is a schematic plan view illustrating a wire harness 210 according to the third embodiment. FIG. 10 is a schematic perspective view illustrating a second connector 214. FIG. 11 is a schematic block diagram illustrating a circuit configuration of the wire harness 210 according to the third embodiment.

In the wire harness 210 according to this embodiment, the positions at which short circuits 85 are provided are different from the positions at which the short circuits (bus bars 16) are provided in the wire harness 110 according to the second embodiment.

Specifically, as the short circuits 85, connection target-side short circuits 85 are provided in the device 80 being a connection target of the second connector 214. In this case, a connector 282 of the connection target has poles twice as many as the number of the circuits of the second circuit group 130.

In a similar manner to the second connector housing 115 according to the second embodiment, cavities for accommodating respective end portions of the wires 40a to 40d, the first-part wires 40g and 40h, and the second-part wires 40i and 40j are formed in a second connector housing 215 of the second connector 214 according to this embodiment. However, in a part corresponding to the cavities for accommodating respective end portions of the first-part wires 40g and 40h and the second-part wires 40i and 40j, the insertion holes 15b similar to those in a part corresponding to the cavities for accommodating the end portions of the wires 40a to 40d are formed. Therefore, the configuration of supporting the bus bars 16 is omitted from the second connector housing 215.

The first-part wires 40g and 40h and the second-part wires 40i and 40j are once connected to the connector 282 of the device 80 being a connection target of the second connector 214, in a similar manner to the wires 40a to 40d. However, the first-part wires 40g and 40h and the second-part wires 40i and 40j are short-circuited by the connection target-side short circuits 85 provided in the device 80. Therefore, another end portion of the second circuit group 130 is eventually connected to the third connector 18, as in the manner described above.

In the example illustrated in FIG. 11, as the connection target-side short circuits 85, two circuits 85 are formed, each of which short-circuits one first-part wire 40g (40h) and one second-part wire 40i (40j). For example, as the two circuits 85, members similar to the bus bars 16 may be provided. Further, for example, the two circuits 85 may be formed in conjunction with a printed circuit board or the like on which the circuits 84 of the device 80 are formed.

According to the wire harness 210 having a configuration as described above, the short circuits 85 include the connection target-side short circuits 85 provided in the connection target of the second connector 214. Therefore, in the second connector housing 215, the configuration of supporting the short circuit (for example, the bus bars 16) can be omitted. As a result, the second connector housing 215 can adopt a connector housing of a simple shape.

Fourth Embodiment

Figure 12:
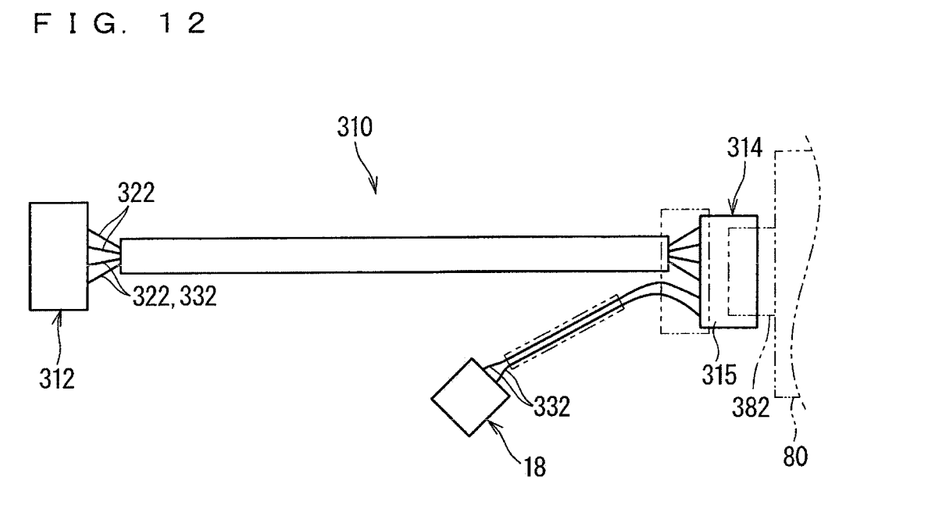
FIG. 12 is a schematic plan view illustrating a wire harness according to a fourth embodiment.
Figure 13:
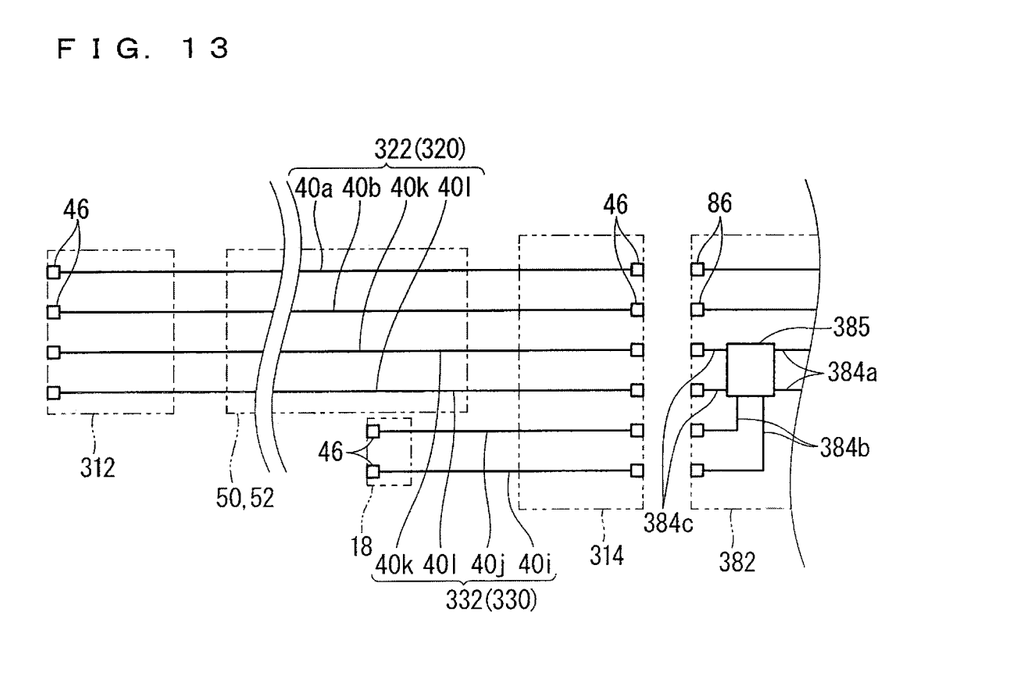
FIG. 13 is a schematic block diagram illustrating a circuit configuration of the wire harness according to the fourth embodiment.

Next, a wire harness according to the fourth embodiment will be described. FIG. 12 is a schematic plan view illustrating a wire harness 310 according to the fourth embodiment. FIG. 13 is a schematic block diagram illustrating a circuit configuration of the wire harness 310 according to the fourth embodiment.

The wire harness 310 according to the fourth embodiment is different from the wire harness 210 according to the third embodiment in that a plurality of types of signals are multiplexed between a first connector 312 and a second connector 314.

Specifically, in a similar manner to the wire harness 210 according to the third embodiment, signal circuits 384a in a first circuit group 320 are connected in the device 80. Further, other signal second-part wires 40i and 40j extending between the second connector 314 and the third connector 18 are also provided. However, in the device 80, circuits 384b connected to the second-part wires 40i and 40j join respective signal circuits 384a in the first circuit group 320, through a function box 385. The function box 385 is connected to the second connector 314 through circuits 384c. The function box 385 includes a known multiplexer, such as a multiplexer circuit for multiplexing signals transmitted through the circuits 384a and signals transmitted through the circuits 384b. For example, the function box 385 includes an IC. Signals multiplexed by the multiplexer of the function box 385 are transmitted to the first connector 312, through the same wires 40k and 40l extending between the first connector 312 and the second connector 314. A connection destination of the first connector 312 includes a function box (not shown) including a known demultiplexer, such as a separation circuit that separates multiplexed signals received through the first connector 312.

Here, not only the signal from the second connector 314 toward the first connector 312 through the wires 40k and 40l, but a signal from the first connector 312 toward the second connector 314 may also be transmitted. In this case, if the signal is transmitted only to a connection destination of the circuit 384a or only to a connection destination of the circuit 384b, the function box 385 directly transmits the signal received through the second connector 314 only to the connection destination of the circuit 384a or only to the connection destination of the circuit 384b. Therefore, in this case, the function box 385 need not include a demultiplexer. In a similar manner, the function box included in the connection destination of the first connector 312 need not include a multiplexer.

In contrast, if a signal from the first connector 312 toward the second connector 314 is transmitted through the wires 40k and 40l, and the signal is transmitted to both of the connection destination of the circuit 384a and the connection destination of the circuit 384b, the function box 385 separates the signal received through the second connector 314, and outputs appropriate separated signals toward the circuit 384a and the circuit 384b. Therefore, in this case, it is recommended that each of the function box 385 of the device 80 and the function box of the connection destination of the first connector 312 include both a multiplexer and a demultiplexer.

Therefore, in the wire harness 310, the wires 40k and 40l are each a component of the first wire group 322 constituting the first circuit group 320, and a component of the second wire group 332 constituting the second circuit group 330. Owing to the configuration of multiplexing a plurality of signals as described above, the first connector 312, the second connector 314, and the connector 382 of the device 80 have less poles than the first connector 12, the second connector 214, and the connector 282 of the device 80 according to the third embodiment.

Here, as the technology of multiplexing a plurality of signals, known technologies of what are called frequency division multiplexing and time division multiplexing can be used, for example.

With the wire harness 310 according to this embodiment, a plurality of types of signals are multiplexed and then transmitted on the same wires 40k and 40l at least between the first connector 312 and the second connector 314. Therefore, the number of wires in this part can be reduced.

{Modifications}

In the description of the first embodiment, each of the wires 40e and 40f is a continuous wire extending from the first connector 12 to the third connector 18, but this configuration is not a requirement. For example, each of the wires 40e and 40f may be a wire that consists of two wires connected by a so-called splice terminal or the like so as to extend from the first connector 12 to the third connector 18. In this case, one of the two wires connected by a splice terminal and having one end portion connected to the first connector may be formed to have the same length as the wires 40a to 40d. According to this configuration, in a similar manner to the wire harnesses 110, 210, and 310 according to the second to fourth embodiments, the length of a cable of a predetermined length cut from a long cable can be reduced. Further, the splice terminal part may be accommodated in the mold part 60. According to this configuration, waterproof property can be provided for the splice terminal part.

Further, in the description of the fourth embodiment, a signal related to the second circuit group 330 and a signal related to the first circuit group 320 join at the device 80, but this configuration is not a requirement. The signal related to the second circuit group 330 and the signal related to the first circuit group 320 may join at the position of the second connector 314. In this case, the second connector 314 may include bus bars, each of which includes three tab terminals joined together. Such a bus bar may allow the wire 40$k$ (40$l$), the second-part wire 40$i$ (40$j$), and the connection member 86 at an end portion of the circuit 384$a$ of the device 80 to be connected.

Note that each configuration described in each embodiment and each modification described above can be appropriately combined on the condition of being consistent with each other.

While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 10, 110, 210, 310 Wire harness
12, 312 First connector
13 First connector housing
13$a$ Cavity
14, 114, 214, 314 Second connector
15, 115, 215, 315 Second connector housing
16 Bus bar
18 Third connector
19 Third connector housing
20 First circuit group
22 First wire group
30 Second circuit group
32 Second wire group
40$a$-40$l$ Wire
42 Core wire
44 Insulation covering
46 Terminal
50 Sheath
52 Shield member
60 Mold part
70 Exterior material
72 Protective cover
80 Device
82, 282, 382 Connector
85 Short circuit
90 Mold

What is claimed is:

1. A wire harness comprising:
   a first circuit group having one end connected to a first connector and another end connected to a second connector;
   a second circuit group having one end connected to the first connector and another end connected to a third connector, the second circuit group branching from the first circuit group at a position of a connection target connected by the second connector; and
   a sheath, wherein
   a first wire group for the first circuit group and the second circuit group is provided between the first connector and the second connector,
   a second wire group for the second circuit group is provided between the second connector and the third connector, and
   the sheath surrounds the first wire group.

2. The wire harness according to claim 1, wherein the connection target is an electronic control unit (ECU).

3. The wire harness according to claim 2, wherein the second connector is connected to a connector of the ECU.

4. The wire harness according to claim 2, wherein the second circuit group branches at a circuit in the ECU.

5. The wire harness according to claim 1, wherein the first wire group includes signal wires transmitting signals multiplexed with signals in the first circuit group and signals in the second circuit group.

6. The wire harness according to claim 1, further comprising
   a shield member surrounding the first wire group.

7. The wire harness according to claim 1, wherein the sheath is an extruded portion extruded to surround the first wire group.

8. The wire harness according to claim 1, wherein the second circuit group is used solely as a signal circuit.

9. A connection structure of the wire harness comprising, the wire harness according to claim 1, and the connection target.

* * * * *